(12) United States Patent
Bathelier et al.

(10) Patent No.: US 10,486,605 B2
(45) Date of Patent: Nov. 26, 2019

(54) OBJECT HOLDER ASSEMBLY IN A VEHICLE

(71) Applicant: Faurecia Automotive Industrie, Nanterre (FR)

(72) Inventors: Xavier Bathelier, Saint Pierremont (FR); Arnaud Duval, Charleville-Mezieres (FR); Markus Uhlig, Stuttgart (DE)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/902,741

(22) Filed: Feb. 22, 2018

(65) Prior Publication Data
US 2018/0178732 A1    Jun. 28, 2018

Related U.S. Application Data

(63) Continuation-in-part of application No. 15/196,570, filed on Jun. 29, 2016, now abandoned.

(30) Foreign Application Priority Data

Jun. 29, 2015   (FR) ...................... 15 56044

(51) Int. Cl.
*B60R 7/02* (2006.01)
*B60R 5/04* (2006.01)
(Continued)

(52) U.S. Cl.
CPC ................. *B60R 7/02* (2013.01); *B60P 7/08* (2013.01); *B60Q 3/30* (2017.02); *B60R 5/04* (2013.01); *B60P 7/14* (2013.01); *B60Q 3/35* (2017.02)

(58) Field of Classification Search
CPC .... B60R 7/02; B60R 7/14; B60R 7/08; B60R 5/04; B60R 7/04; B60P 7/08; B60P 7/14; F16B 47/00
(Continued)

(56) References Cited

U.S. PATENT DOCUMENTS 4,842,460 A    6/1989   Schlesch
5,366,189 A    11/1994  Thompson
(Continued)

FOREIGN PATENT DOCUMENTS

FR    2787154 A1    6/2000

OTHER PUBLICATIONS

French Preliminary Search Report, in French, corresponding to application No. FR1556044, dated Apr. 26, 2016, 2 pages.

*Primary Examiner* — Dennis H Pedder
(74) *Attorney, Agent, or Firm* — Reising Ethington P.C.

(57) ABSTRACT

An object holder assembly in a vehicle that includes a floor having a metal layer and an upper face intended to support at least one object. The vehicle includes at least one trunk separator having a base able to be applied on the floor and a separating partition. The separator includes a fastening device having an active configuration in which the fastening device is able to fasten the base on the floor when a lower face of the base is in contact with the upper face of the floor and a released configuration of the separator. The separator has a control member for the fastening device, able to be actuated between a locking position, in which the control member activates the fastening device, and an unlocking position. The fastening device has a movable magnet able to cooperate with the floor in the active configuration.

10 Claims, 6 Drawing Sheets

(51) Int. Cl.
  *B60P 7/14*   (2006.01)
  *B60Q 3/30*   (2017.01)
  *B60P 7/08*   (2006.01)
  *B60Q 3/35*   (2017.01)

(58) Field of Classification Search
  USPC .......................................................... 211/184
  See application file for complete search history.

(56) References Cited

U.S. PATENT DOCUMENTS

| | | |
|---|---|---|
| 5,961,171 A | 10/1999 | Iijima |
| 6,109,847 A | 8/2000 | Patel et al. |
| 8,317,040 B2 | 11/2012 | Lanning |
| 9,261,304 B2 | 2/2016 | Tunzi |
| 2009/0139050 A1 | 6/2009 | Junkins |
| 2015/0136785 A1 | 5/2015 | Tso et al. |
| 2016/0375836 A1 | 12/2016 | Bathelier et al. |

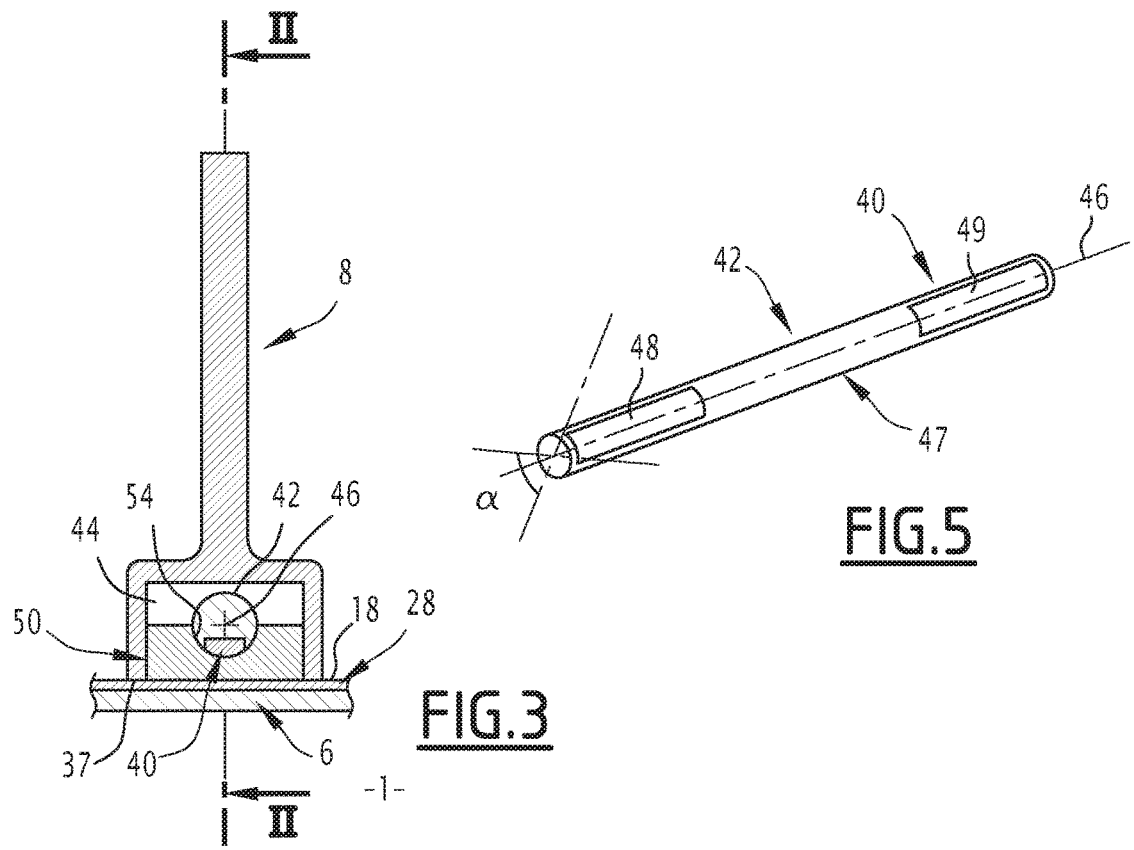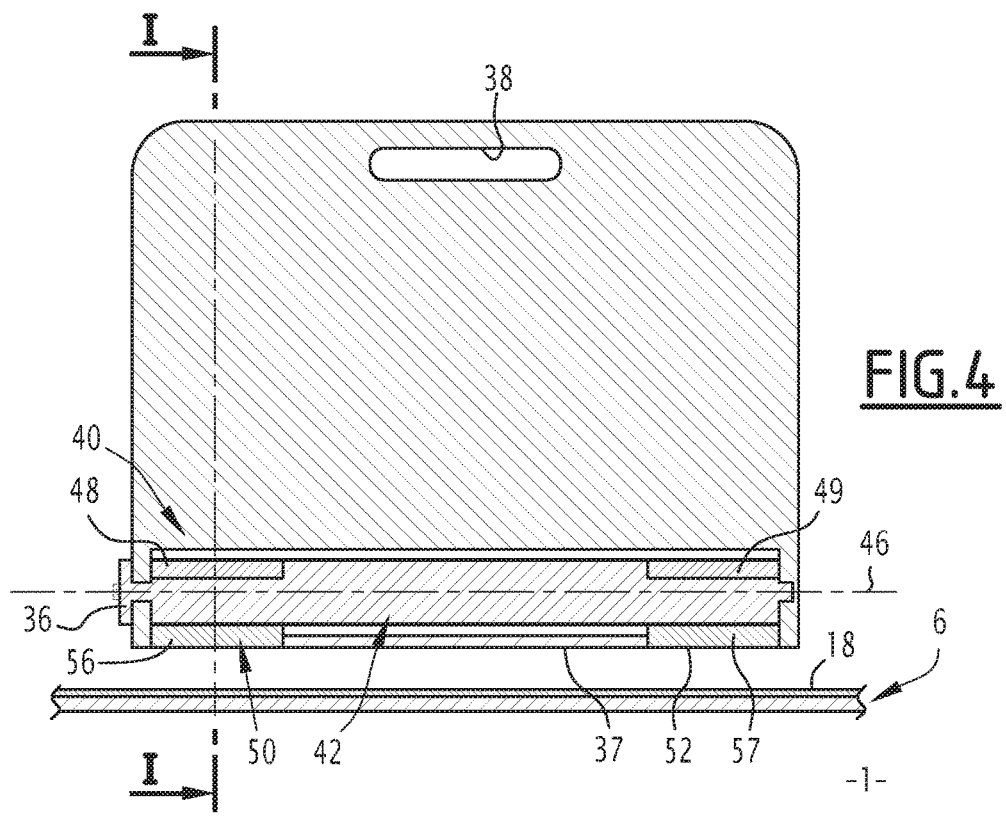

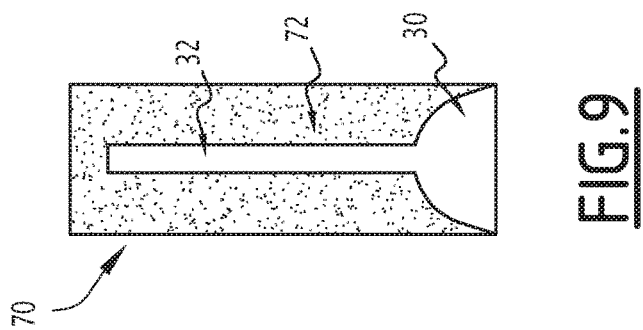
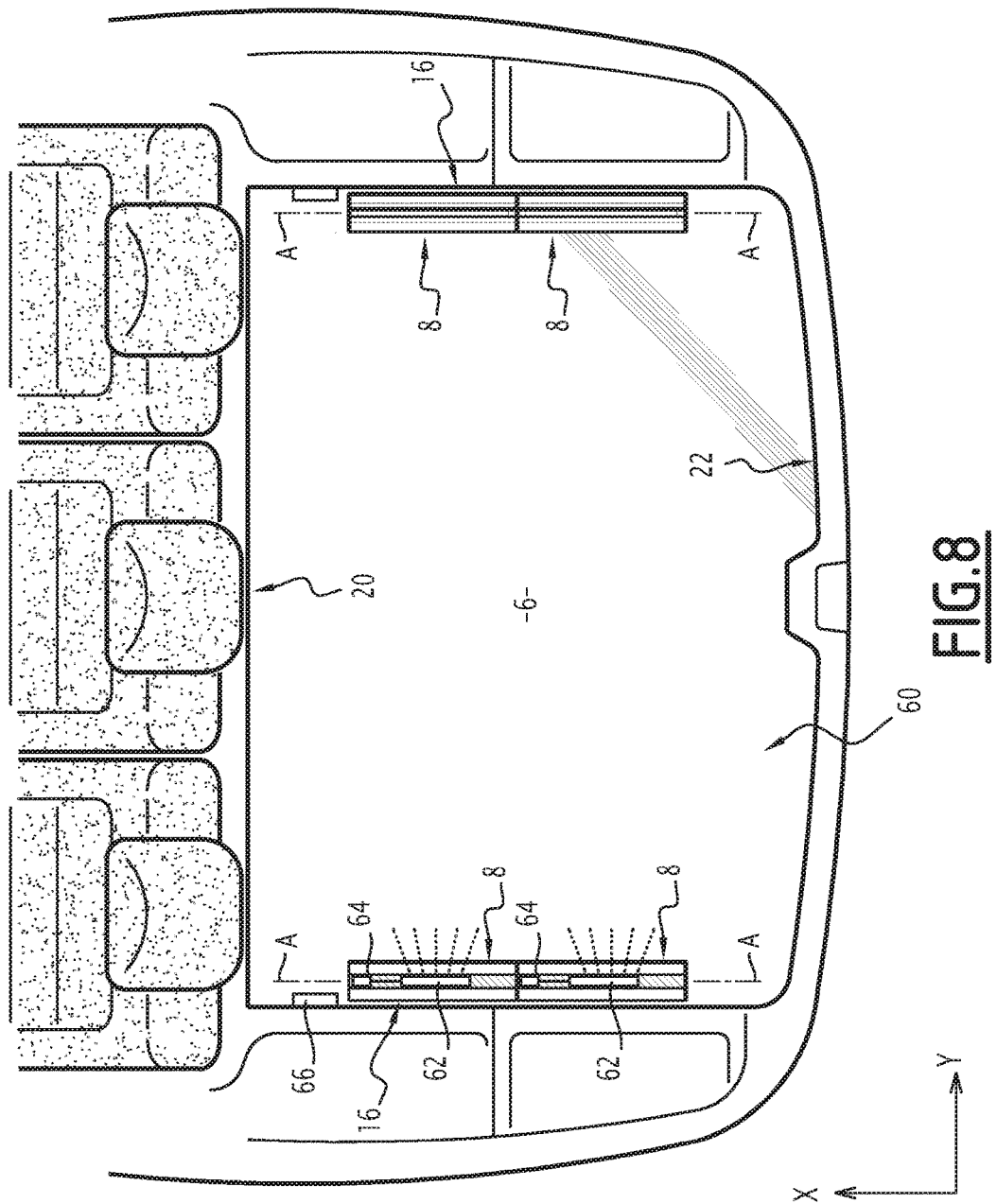

OBJECT HOLDER ASSEMBLY IN A VEHICLE

TECHNICAL FIELD

The present invention relates to an object holder assembly in a vehicle comprising:

a floor having an upper face intended to support at least one object, the floor comprising a metal layer, and at least one trunk separator having a base able to be applied on the floor and a separating partition.

BACKGROUND

Such a device is generally intended to equip an inner vehicle space, in particular of an automobile, such as a rear trunk.

For example, document CN 201317319 describes an object holder assembly in which the base of the separator is positioned in holes pierced in the floor to produce a partition.

However, the shapes and sizes of the objects able to be held by such a holder assembly are limited by the arrangement of the holes. Furthermore, the mechanical fastening of such a separator is not ensured in case of impact of the vehicle.

SUMMARY

The invention aims to resolve these drawbacks by providing an object holder assembly capable of securely holding objects with different shapes or sizes. In particular, one aim of the invention is to ensure effective holding of objects upon any impact or sharp braking of the vehicle to hold them in position while allowing a simple modification of the position of the separators.

To that end, the invention relates to an object holder assembly of the aforementioned type, wherein the separator comprises a fastening device having an active configuration in which the fastening device is able to fasten the base on the floor when a lower face of the base is in contact with the upper face of the floor and a released configuration of the separator, and a control member for the fastening device, able to be actuated between a locking position, in which the control member activates the fastening device, and an unlocking position; and wherein the fastening device comprises a movable magnet able to cooperate with the floor in the active configuration.

The object holder assembly according to the invention may include one or more of the following features, considered alone or in combination:

the control member is able to move the magnet relative to the base between a close position in the locking configuration and a remote position in the unlocking position;

the fastening device comprises a supporting rod able to rotate relative to the base around a rotation axis, said rotation axis being parallel to the lower face of the base, wherein the magnet is attached to the supporting rod and included in an angular portion of said supporting rod relative to the rotation axis, said angular portion forming an angle inferior to 180°;

the fastening device comprises a block of ferromagnetic material, attached to the base and situated between the lower face and the rotation axis of the supporting rod, so that, in the active configuration, the magnet is in contact with the block and applies a magnetic field to the ferromagnetic material; and in the released configuration, the magnet is distant from the block;

in the active configuration, the fastening device is able to fasten the separator to the floor irrespective of the position of the base in contact with the upper face of the floor;

the separator comprises a cover layer made from a deformable or elastic material;

the separator comprises a handle;

the width of the trunk and the depth of the trunk are a multiple of the length of the base, and preferably, a multiple of the width of the base;

the separator further comprises a light source, and a battery able to power the light source, the battery being able to recharge when the separator is positioned in a storage position;

the storage position is situated along a lateral trim.

BRIEF DESCRIPTION OF THE DRAWINGS

The invention will be better understood upon reading the following description, provided solely as an example and done in reference to the appended figures, in which:

FIG. 3 is a diagrammatic sectional view along plane I-I of the object holder assembly of FIG. 1, the separator being in a first configuration and fastened on the floor;

FIG. 4 is a diagrammatic sectional view along plane II-II of the object holder assembly of FIG. 1 being in a second configuration and separated from the floor;

FIG. 5 is a perspective view of an element of the separator of FIGS. 1 to 4;

FIG. 8 is a view similar to FIG. 1 of an object holder assembly according to a second embodiment of the invention; and FIG. 9 is a view similar to FIG. 3 of a separator of an object holder assembly according to a third embodiment of the invention.

DETAILED DESCRIPTION OF THE ILLUSTRATED EMBODIMENTS

Figure 1:
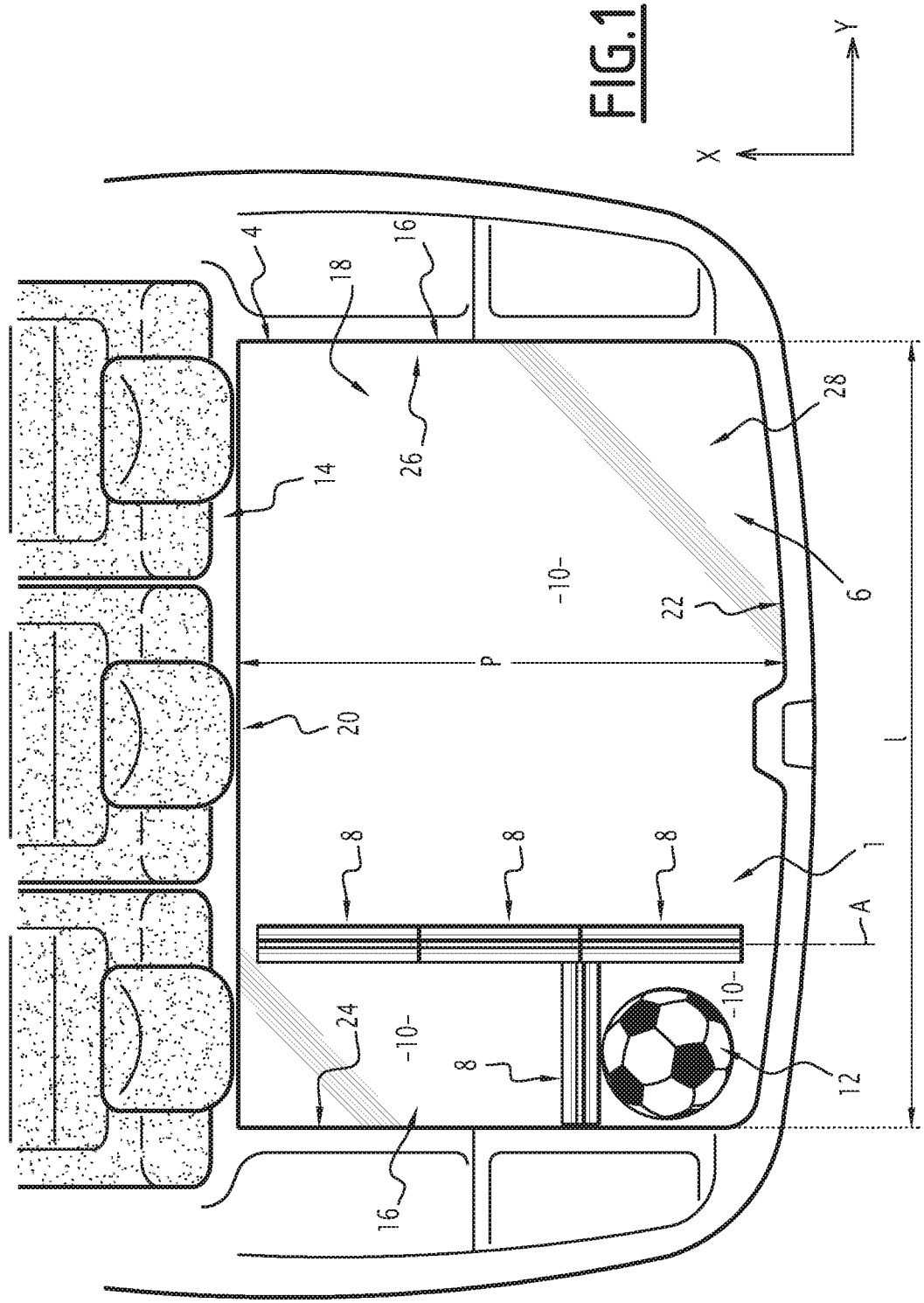
FIG. 1 is a diagrammatic top view of an object holder assembly in a vehicle, according to a first embodiment of the invention, said object holder assembly comprising a floor and a trunk separator.

In the following, the orientations are the usual orientations for a vehicle. Thus, the terms "upper", "lower", "left", "right", "top", "bottom" are to be understood relative to the normal travel direction of a vehicle and relative to the position of a driver.

FIGS. 1 to 4 illustrate a first object holder assembly 1 in a vehicle according to a first embodiment of the invention.

The first object holder assembly 1 is intended to be installed in the rear trunk 4 of a vehicle, in particular an automobile. The first object holder assembly 1 comprises a floor 6 and at least one trunk separator 8. The first object holder assembly 1 is able to form, in the trunk 4, a partitioned compartment 10 for transporting at least one object 12.

The trunk 4 is a space generally delimited in the forward direction by the seats 14 of the vehicle, on the sides by the side trim 16, on the bottom by the floor 6, and at the rear by a tailgate (not shown) articulated on the body of the motor vehicle. If applicable, the trunk 4 is also upwardly defined by a moving tray, not shown.

The floor 6 has an upper face 18 intended to support at least one object 12. The objects 12 supported by the floor may have a significant mass, for example greater than 100 g. The upper face 18 of the floor 6 is the face of the floor 6 that is turned upward when the first holder assembly 1 is mounted in the vehicle.

As illustrated by FIG. 1, the upper face 18 of the floor 6 is defined by the outer edges 20, 22, 24, 26. The upper face 18 extends longitudinally between a front edge 20 and a rear edge 22. The upper face 18 of the floor extends transversely between a left side edge 24 and a right side edge 26 respectively placed along lateral trims 16. The depth P of the trunk 4 is the maximum distance along the longitudinal axis X of the vehicle between the front edge 20 and the rear edge 22. The width 1 of the trunk 4 is the maximum distance along the transverse axis Y of the vehicle between the left side edge 24 and the right side edge 26.

In the first object holder assembly 1, the floor 6 comprises a metal layer 28. The metal layer 28 is for example a foil. In the example shown in FIGS. 1 to 4, the entire upper face 18 of the floor 6 is covered with the metal layer 28. Alternatively, the metal layer 28 is integrated into the thickness of the floor 6 or covers the lower face of the floor 6, advantageously over the entire surface of the floor 6.

The first object holder assembly 1 shown in FIGS. 1 to 4 includes four separators 8.

Figure 2:
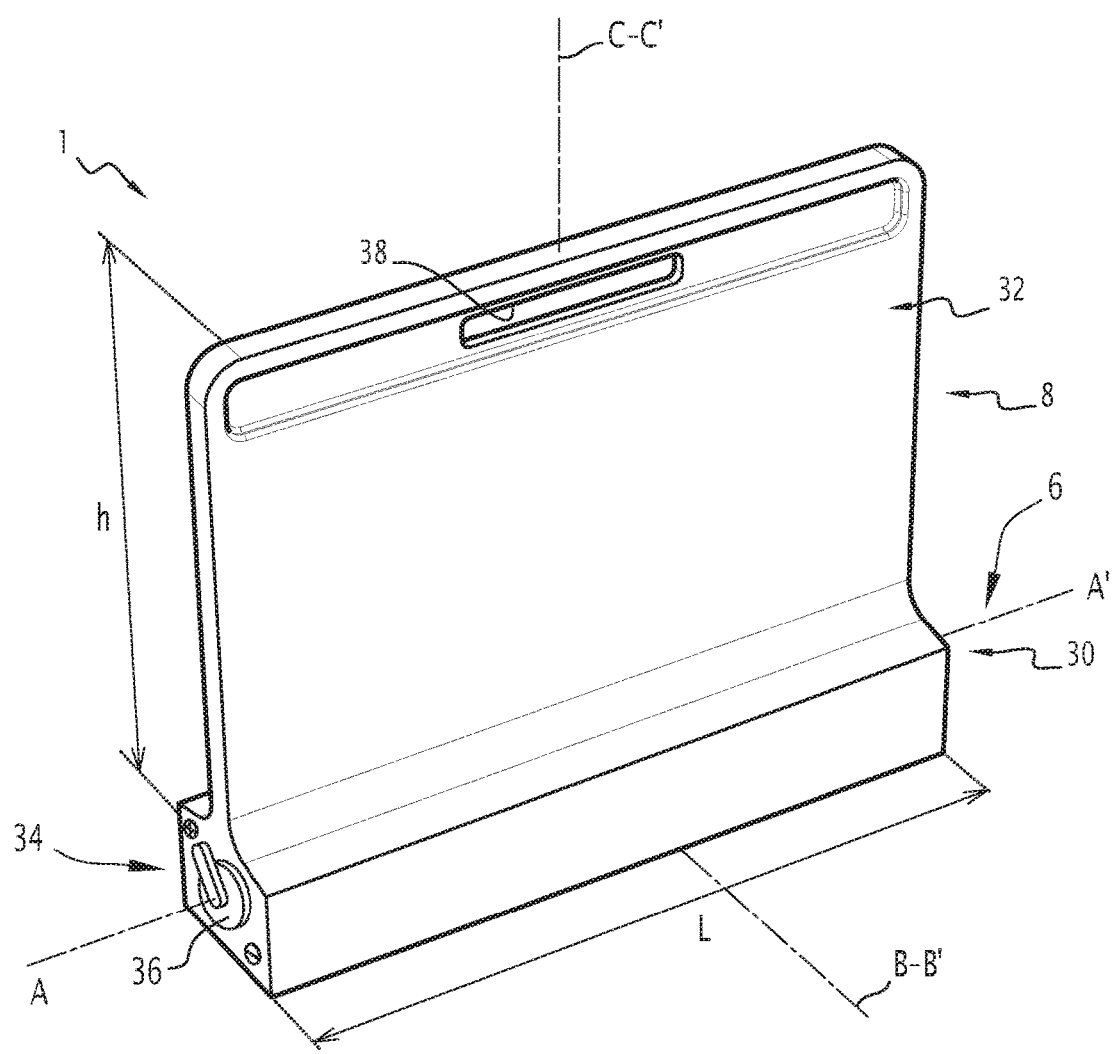
FIG. 2 is a diagrammatic perspective view of the trunk separator of the object holder assembly of FIG. 1.

One separator 8 is shown in detail in FIGS. 2 to 4. The trunk separator 8 has a base 30 and a separating partition 32. Furthermore, each separator 8 includes a fastening device 34 and a control member 36 for the fastening device 34.

A lower face 37 of the base 30 is able to be applied on the upper face 18 of the floor 6.

For example, the outer contour of the base 30 of the separator 8 is rectangular. The base 30 of the separator 8 is elongated along a main axis A-A'.

Figure 6:
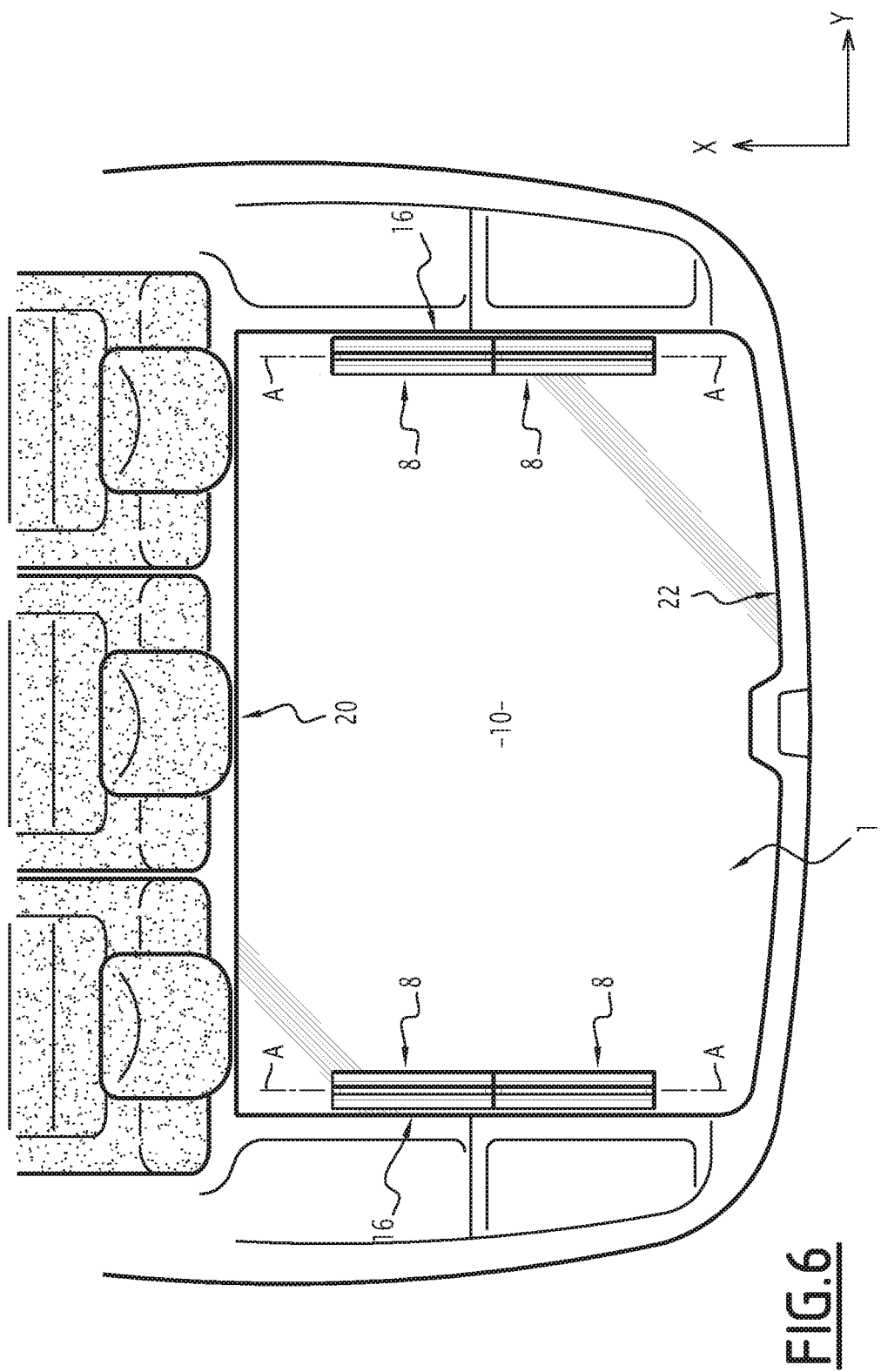
FIGS. 6 and 7 are views similar to FIG. 1, showing alternative arrangements of different separators of the object holder assembly according to the first embodiment of the invention.
Figure 7:
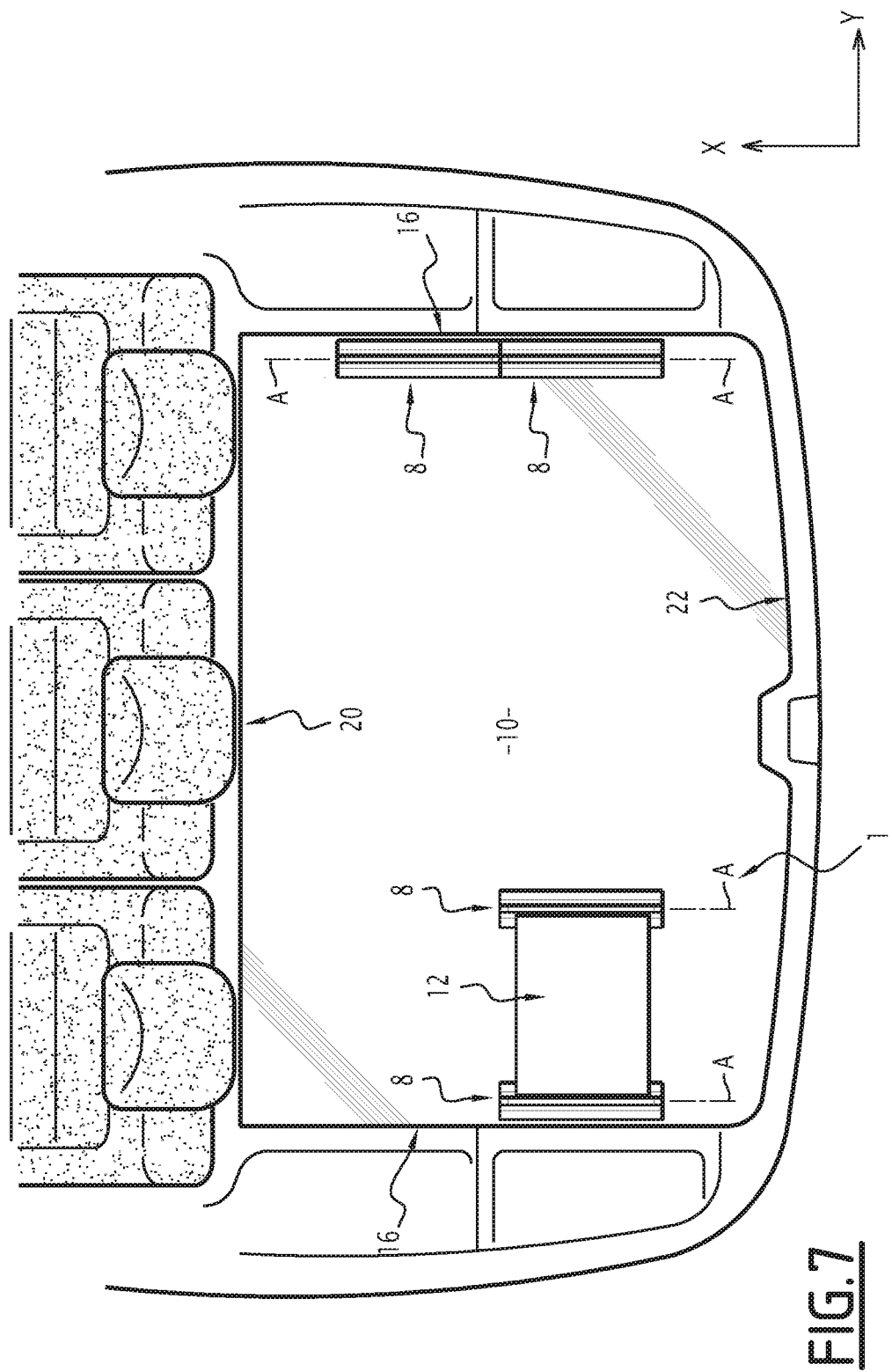

The length L of the base 30 is advantageously a multiple shared by the width 1 and depth P of the trunk 4. In other words, the width 1 of the trunk 4 and the depth P of trunk 4 are a multiple of the length L of the base 30. This facilitates the storage of the separators 8 in the trunk 4 and the separation of the trunk 4 into several compartments 10 as illustrated in FIGS. 1, 6 and 7. Furthermore, advantageously, the width 1 of the trunk 4 and the depth P of the trunk 4 are a multiple of the width of the base 30.

For example, the length L of the base 30 along the main axis A-A' is comprised between 30 cm and 40 cm. For example, the width of the base 30 along the secondary axis B-B' perpendicular to the main axis A-A' is comprised between 5 cm and 15 cm.

The partition 32 is able to separate the space in the trunk 4 into separate compartments 10.

The separating partition 32 is a wall that extends from the base 30 substantially perpendicular to the base 30. The separating partition 32 is intended to extend along a substantially vertical plane when the lower face 37 of base 30 is applied on the floor 6.

The height h of the separating partition 32 along the axis C-C' perpendicular to the main axis A-A' and the secondary axis B-B' is smaller than the height of the trunk 4. Furthermore, when the trunk 4 is separated into two parts by a tray, the height of the partition 32 is smaller than the height of the lower part of the trunk 4.

Advantageously, the separator 8 further comprises a handle 38. The handle 38 is for example placed on the upper part of the partition 32.

The handle 38 allows gripping of the separator 8. This facilitates the movement of the separator 8 relative to the floor 6 when the fastening device 34 is in the released configuration.

The fastening device 34 has an active configuration, shown in FIG. 3, and a released configuration of the separator 8, shown in FIG. 4.

In the active configuration, the fastening device 34 is able to fasten the base 30 on the floor 6 when the base 30 is in contact with the upper face 18 of the floor 6. The fastening device 34 is able to fasten the separator 8 to the floor 6 irrespective of the position of the base 30 in contact with the upper face 18 of the floor 6. When the base 30 is fastened to the floor 6 by the fastening device 34 in the active configuration, the force exerted by the fastening device 34 is sufficient to prevent an untimely release of the separator 8. Advantageously, the maintaining force of the base 30 on the floor 6 exerted by the fastening device 34 is greater than 50 N.

In the released configuration of the separator 8, the base 30 is free relative to the floor 6.

In the first holder assembly 1, shown in FIGS. 3 and 4, the fastening device 34 comprises a moving magnet 40 able to cooperate with the floor 6. The magnet 40 is able to move between a position close to the base 30 when the fastening device 34 is in the active configuration and a position remote from the base 30 when the fastening device 34 is in the released configuration.

More precisely, in the first holder assembly 1, the fastening device 34 comprises a supporting rod 42 located in a cavity 44 of the base 30. The supporting rod 42 is substantially cylindrical and extends along an axis 46 parallel to the main axis A-A' of the base 30. The supporting rod 42 is able to rotate relative to the base 30 around said axis 46.

FIG. 5 shows a perspective view of the magnet 40 and supporting rod 42. The magnet 40 is attached to the supporting rod 42 and forms a cylindrical surface 47 together with said supporting rod. The magnet 40 is included in an angular portion a of said supporting rod, relative to the rotation axis 46. The angle of said angular portion a is inferior to 180° and preferably comprised between 60° and 120°.

In the embodiment shown in FIGS. 3 to 5, the magnet 40 comprises two parts 48 and 49 apart from each other, each part being situated at an end of the supporting rod 42. According to another embodiment (not shown), the magnet 40 is made of a single piece, extending to at least a part of a length of the supporting rod 42. According to another embodiment (not shown), the magnet 40 is made of more than two parts.

The fastening device also comprises a block 50 of ferromagnetic material, such as iron. The block 50 is attached to the base 30 and situated between the lower face 37 of said base and the rotation axis 46 of the supporting rod 42. In the embodiment shown in FIGS. 3 and 4, the block 50 comprises a flat surface 52 continuous with the lower face 37 of the base.

Opposed to the flat surface 52, the block 50 comprises a concave surface 54 of hemi-cylindrical shape, substantially complementary to the cylindrical surface 47 formed by the magnet 40 and the supporting rod 42. The rotation axis 46 is positioned so that the supporting rod 42 is substantially in contact with the concave surface 54 while being able to rotate around said rotation axis 46.

In the embodiment shown in FIGS. 3 and 4, the block 50 comprises two parts 56 and 57 apart from each other, each part being situated at an end of the base 30, level to one of the two parts 48 and 49 of the magnet 40. According to another embodiment (not shown), the block 50 is made of a single piece, extending to at least a part of a length of the base 30. According to another embodiment (not shown), the block 50 is made of more than two parts, corresponding to parts of the magnet 40.

In the active configuration, shown in FIG. 3, the magnet 40 is oriented towards the lower face 37 of the base 30 and in contact with the concave surface 54 of the block 50. Therefore, the magnet 40 applies a magnetic field to the ferromagnetic material, turning the block 50 into a non-permanent magnet. The surface 52 and the lower face 37 of the base are thus attached to the floor 6 by a magnetic force.

When the base 30 is fastened to the floor 6 in the active configuration, the magnetic force exerted between the block 50 and the floor 6 is for example greater than 50 N.

In the released configuration, shown in FIG. 4, the magnet 40 is oriented opposite the lower face 37 and distant from the block 50. Therefore, the magnet 40 applies no magnetic field, or a weak magnetic field, to the block 50. As a result, the surface 52 of said block 50 is not attached to the floor 6.

The control member 36 of the fastening device 34 can be actuated between a locking position and an unlocking position. In the locking position of the control member 36, the fastening device 34 is in the active configuration. In the unlocking position of the control member 36, the fastening device 34 is in the released configuration.

According to an embodiment, the control member 36 is constrained toward its locking position.

As shown in FIGS. 2 and 4, the control member 36 is for example a switch placed on the base 30 and attached to an end of the supporting rod 42.

In order to change a disposition of the first holder assembly 1, a user switches the control member 36 to the unlocking position. The magnet 40 moves toward the remote position of the released configuration of the fastening device 34. The user then grasps the handle 38 and moves the separator 8 relative to the floor 6. Depending on the needs, he positions it in another location on the floor 6.

Once the separator 8 is positioned in the chosen location, the user switches the control member 36 to the locking position. The magnet 40 rotates to the close position of the active configuration of the fastening device 34, and exerts a maintaining force of the separator 8 on the floor 6.

Each separator 8 is thus movable when the control member 36 is in the unlocking position. Each separator 8 remains securely fastened to the floor, in the position chosen by the user as long as the control member 36 is in the locking position.

FIGS. 1, 6 and 7 illustrate arrangements of the separators 8 on the floor 6. These arrangements are only particular examples. The user may indeed place each separator 8 on the floor 6 in a different position and with a different orientation.

When the user wishes to create a compartmentalization of the trunk 4, he places each separator 8 in the most appropriate configuration for the size of the objects 12 to be separated or held.

In the example of FIG. 1, the first holder assembly 1 forms three separate compartments 10. Each compartment 10 is partitioned from the others by one or more separators 8. The volume and shape of the compartments 10 are suitable for the size of the objects 12 to be transported.

The separators 8 not used for a desired compartmentalization are advantageously left in a storage position.

In FIG. 6, each separator 8 is in a storage position. Advantageously, in the storage position, the separator 8 is positioned on an outer edge 20, 22, 24, 26 of the floor 6 so as not to clutter the trunk 4. For example, as illustrated in FIG. 6, in the storage position, the separator 8 is stored in the trunk 4 along a lateral trim 16 of the trunk 4. Advantageously, the main axis A-A' of each separator 8 is substantially parallel to the direction in which the lateral trim 16 of the trunk extends against which it is stored. Alternatively, in the storage position, the separator 8 is stored along the seats 14 and the main axis A-A' of the separator is parallel to the transverse axis Y of the vehicle.

When the user wishes to hold a particular object 12, he may position several separators 8 around the object 12 to block it. He may form a vertically partitioned volume with a closed contour as in FIG. 1 or an open contour as in FIG. 7. The separators 8 are in contact with the object 12 on either side of the object 12. In the example shown in FIG. 7, two separators 8 are placed on either side of an object 12, the other separators 8 being in the storage position.

FIG. 8 illustrates a second holder assembly 60 according to an embodiment of the invention. This holder assembly 60 differs from the first holder assembly 1 previously described in that the separator 8 comprises a light source 62 and a battery 64 able to power the light source 62.

The light source 62 for example includes light-emitting diodes. The light source 62 is able to light the inside of the trunk 4. Alternatively or additionally, the light source 62 may be used outside the trunk 4, or even outside the vehicle. Indeed, the user can freely move the separator 8 relative to the floor 6 and the released configuration. Such a separator 8 then serves as a flashlight.

Advantageously, the passage of the control member 36 from the locking positions toward the unlocking position triggers the activation of the light source 62. The light source 62 is thus activated only during the movement of the separators 8 by the user. Alternatively, lighting with a lower energy consumption is retained when the control member 36 is in the locking position. Alternatively, the activation of the light source 62 is controlled by a control button independent from the control member 36.

The battery 64 is rechargeable. For example, the battery 64 comprises a rechargeable cell. The vehicle advantageously includes a charging unit 66 for charging the battery 64. Advantageously, the battery 64 is able to recharge when the separator 8 is positioned in a storage position. In the example illustrated in FIG. 8, a recharging unit 66 is placed on a lateral trim 16 of the trunk. Alternatively, the recharging unit is for example on the floor 6.

For example, the charging unit 66 is connected to the battery 64 of the separator 8 in the storage position by electric plugs. Alternatively, the battery 64 of the separator 8 in the storage position recharges by induction from the charging unit 66.

FIG. 9 illustrates a third holder assembly 70 according to an embodiment of the invention. This holder assembly 70 differs from the holder assemblies 1, 60 previously described in that the separator 8 comprises a cover layer 72 formed from a deformable or plastic material.

The cover layer 72 covers the separating partition 32. Alternatively or additionally, the cover layer 72 covers the base 30. Alternatively, the cover layer 32 has a thickness allowing it to extend past the base 30, the thickness of the separator 8 along the secondary axis B-B' becoming slightly larger at the width of the base 30.

Alternatively or additionally, the cover layer 70 is able to marry the shape of the object 12 to better hold it. When the separator 8 is no longer in contact with the object 12, the cover layer 72 is forced toward an idle configuration.

The cover layer 72 of the separator 8 makes it possible to absorb impacts in case of movement of an object 12 present inside the compartment 10.

The embodiments described above provide the user with an object holder assembly 1, 60, 70 capable of securely holding objects 12 with different shapes or sizes. The holder assembly 1, 60, 70 provides effective holding of the objects 12 during an impact or sharp braking of the vehicle to keep them in position. Furthermore, the position of the separators 8 is easy to change. Indeed, the separators 8 are able to fasten themselves to the floor 6 securely, but in a manner that is easy to release. It suffices to unlock the fastening device 34 to be able to move the separator 8.

Furthermore, the object holder assembly 1, 60, 70 is simple and compact. Indeed, the user is not bothered by the separators 8 when they are in the storage position. He can easily change the compartmentalization of the trunk 4 based on his needs.

Alternatively, the number of separators 8 is different. For example, the holder assembly 1, 60, 70 includes a single separator 8 making it possible to separate the trunk 4 into two compartments 10. Advantageously, the number of separators 8 is greater than or equal to two to allow blocking of an object 12 between at least two separators 8.

The invention claimed is:

1. An object holder assembly in a vehicle comprising:
    a floor having an upper face intended to support at least one object, the floor comprising a metal layer, and
    at least one trunk separator having a base able to be applied on the floor and a separating partition,
    wherein the separator comprises a fastening device having an active configuration in which the fastening device is able to fasten the base on the floor when a lower face of the base is in contact with the upper face of the floor and a released configuration of the separator, and a control member for the fastening device, able to be actuated between a locking position, in which the control member activates the fastening device, and an unlocking position,
    wherein the fastening device comprises a movable magnet able to cooperate with the floor in the active configuration,
    wherein the control member is able to move the magnet relative to the base between a close position in the locking position and a remote position in the unlocking position,
    wherein the fastening device comprises a supporting rod able to rotate relative to the base around a rotation axis, said rotation axis being parallel to the lower face of the base, and
    wherein the magnet is attached to the supporting rod and included in an angular portion of said supporting rod relative to the rotation axis, said angular portion forming an angle less than 180°.

2. The assembly according to claim 1, wherein said angle is between 60° and 120°.

3. The assembly according to claim 1, wherein the fastening device comprises a block of ferromagnetic material, attached to the base and situated between the lower face and the rotation axis of the supporting rod,
    so that, in the active configuration, the magnet is in contact with the block and applies a magnetic field to the ferromagnetic material; and in the released configuration, the magnet is distant from the block.

4. The assembly according to claim 1, wherein in the active configuration, the fastening device is able to fasten the separator to the floor irrespective of the position of the base in contact with the upper face of the floor.

5. The assembly according to claim 1, wherein the separator comprises a cover layer made from a deformable or elastic material.

6. The assembly according to claim 1, wherein the separator comprises a handle.

7. The assembly according to claim 1, wherein a width of the trunk and a depth of the trunk are a multiple of a length of the base.

8. The assembly according to claim 7, wherein the width of the trunk and the depth of the trunk are a multiple of a width of the base.

9. The assembly according to claim 1, wherein the separator further comprises a light source and a battery able to power the light source, the battery being able to recharge when the separator is positioned in a storage position.

10. The assembly according to claim 9, wherein the storage position is situated along a lateral trim.

\* \* \* \* \*